US010748244B2

(12) United States Patent
Rochford et al.

(10) Patent No.: US 10,748,244 B2
(45) Date of Patent: Aug. 18, 2020

(54) SYSTEMS AND METHODS FOR STEREO CONTENT DETECTION

(71) Applicant: Samsung Electronics Co., Ltd., Suwon-si (KR)

(72) Inventors: Ciaran Rochford, Bellevue, WA (US); Thomas Flynn, Cupertino, CA (US); Danke Xie, San Jose, CA (US); Teresa Mao, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 15/811,094

(22) Filed: Nov. 13, 2017

(65) Prior Publication Data
US 2018/0357781 A1    Dec. 13, 2018

Related U.S. Application Data

(60) Provisional application No. 62/517,851, filed on Jun. 9, 2017.

(51) Int. Cl.
*G06K 9/00* (2006.01)
*G06T 3/40* (2006.01)
(Continued)

(52) U.S. Cl.
CPC ............ *G06T 3/40* (2013.01); *G06K 9/00335* (2013.01); *G06K 9/00671* (2013.01);
(Continued)

(58) Field of Classification Search
CPC . G06T 7/68; G06T 7/593; G06T 2207/10021; G06T 3/40; G06K 9/62212; G06K 9/6215; H04N 1/40068
See application file for complete search history.

(56) References Cited

U.S. PATENT DOCUMENTS 7,158,656 B2 * 1/2007 Covell ............... G06K 9/00369
348/139
7,505,841 B2 * 3/2009 Sun .................... G06K 9/00362
345/419
(Continued)

FOREIGN PATENT DOCUMENTS

KR    10-0827133 B1    5/2008

OTHER PUBLICATIONS

Notification of Transmittal of the International Search Report and the Written Opinion of the International Searching Authority, or the Declaration dated Jun. 8, 2018 in connection with International Patent Application No. PCT/KR2018/001915.
(Continued)

*Primary Examiner* — Amir Alavi

(57) ABSTRACT

A method for detecting stereo images includes receiving an image and analyzing at least a portion of the image. The method further includes determining whether the image is a stereo image based on the analysis. The method may include determining if a portion of the image contains an expected icon, may determine if left and right halves of the image contain expected symmetry, may determine if histograms of the left and right halves are similar, or the like. The method further includes generating a confidence value related to the determination of whether the image is stereo or non-stereo, the confidence value indicating a likelihood that the determination is correct.

20 Claims, 13 Drawing Sheets

(51) Int. Cl.
*H04N 1/40* (2006.01)
*G06T 7/68* (2017.01)
*G06T 7/593* (2017.01)
*G06K 9/62* (2006.01)
*G06T 1/20* (2006.01)

(52) U.S. Cl.
CPC ......... *G06K 9/6212* (2013.01); *G06K 9/6215* (2013.01); *G06T 7/593* (2017.01); *G06T 7/68* (2017.01); *H04N 1/40068* (2013.01); *G06T 1/20* (2013.01); *G06T 2207/10021* (2013.01)

(56) References Cited

U.S. PATENT DOCUMENTS

| | | | |
|---|---|---|---|
| 8,897,545 B2* | 11/2014 | Schlosser | G06T 7/593 382/154 |
| 9,106,894 B1 | 8/2015 | Kvaalen et al. | |
| 9,135,710 B2* | 9/2015 | Cohen | G06T 7/593 |
| 9,142,026 B2* | 9/2015 | Jachalsky | G06T 7/593 |
| 9,355,468 B2* | 5/2016 | Pajak | G06T 9/00 |
| 9,465,444 B1* | 10/2016 | Ramaswamy | G06F 3/017 |
| 2011/0199469 A1 | 8/2011 | Gallagher | |
| 2012/0038744 A1 | 2/2012 | Naka | |
| 2012/0249741 A1* | 10/2012 | Maciocci | G06F 3/011 348/46 |
| 2012/0253596 A1* | 10/2012 | Ibrahim | G06K 9/00798 701/36 |
| 2013/0064443 A1 | 3/2013 | Schlosser | |
| 2013/0176300 A1* | 7/2013 | Robert | G06T 15/00 345/419 |
| 2018/0014001 A1* | 1/2018 | Lee | G01B 11/24 |
| 2018/0357781 A1* | 12/2018 | Rochford | G06T 7/68 |

OTHER PUBLICATIONS

Alwan, Rehab H.; "Automatice Stereo Image Matching Using Edge Detection Technique"; International Archives of Photogrammetry and Remote Sensing; 1996; 7 pages; vol. XXXI, Part B3; Vienna.

* cited by examiner

SYSTEMS AND METHODS FOR STEREO CONTENT DETECTION

CROSS-REFERENCE TO RELATED APPLICATION AND CLAIM OF PRIORITY

This application claims priority under 35 U.S.C. § 119(e) to U.S. Provisional Patent Application No. 62/517,851 filed on Jun. 9, 2017. The above-identified provisional patent application is hereby incorporated by reference in its entirety.

TECHNICAL FIELD

This disclosure relates generally to image processing. More specifically, this disclosure relates to detection of stereo content in images.

BACKGROUND

Various stereo display devices use stereo images to create the illusion of a 3D image. In some stereo display devices, a pair of stereo image presented on a 2D display is focused through lenses on the eyes of the operator such that the operator perceives a 3D image. In such display devices, presenting a non-stereo image on the display causes the operator to perceive a confusing image.

SUMMARY

This disclosure provides systems and methods for stereo content detection.

In a first embodiment, a method comprises receiving an image and analyzing at least a portion of the image. The method further includes determining whether the image is a stereo image based on the analysis and generating a confidence value related to the determination, the confidence value indicating a likelihood that the determination is correct In a second embodiment, a system comprises a display configured to display stereo and non-stereo images and a processor configured to receive an image and analyze at least a portion of the image. The processor is further configured to determine whether the image is a stereo image based on the analysis and generate a confidence value related to the determination, the confidence value indicating a likelihood that the determination is correct.

In a third embodiment, a non-transitory computer readable medium embodies a computer program, and the computer program comprises computer readable program code that when executed causes at least one processing device to receive an image and analyze at least a portion of the image. The computer program further comprises computer readable program code that when executed causes at least one processing device to determine whether the image is a stereo image based on the analysis and generate a confidence value related to the determination, the confidence value indicating a likelihood that the determination is correct.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Embodiments of this disclosure recognize that operators of an electronic head mounted device, or head mountable device (HMD), may wish to use both 3D and 2D applications while wearing the HMD. In some embodiments, the HMD includes a detachable electronic device, such as a mobile phone, that provides the 3D and 2D images through an integrated display. Such devices may provide 3D images using stereo techniques. Stereo 3D images may be created by displaying a left half image and a right half image on the display of the mobile device. The HMD contains lenses that focus the left half image on an operator's left eye and the right half image on the operator's right eye, causing the illusion of a 3D image. Accordingly, if a non-stereo 2D image is presented on the display and projected through the stereo lenses of the HMD, the operator may not perceive a useful image as the operator's left eye will see the left half of the non-stereo 2D image and the operator's right eye will see the right half of the non-stereo 2D image. Embodiments of the disclosure accordingly present systems and methods for determining, before displaying an image on a display of an HMD, whether the image is a stereo or non-stereo image.

Figure 1:
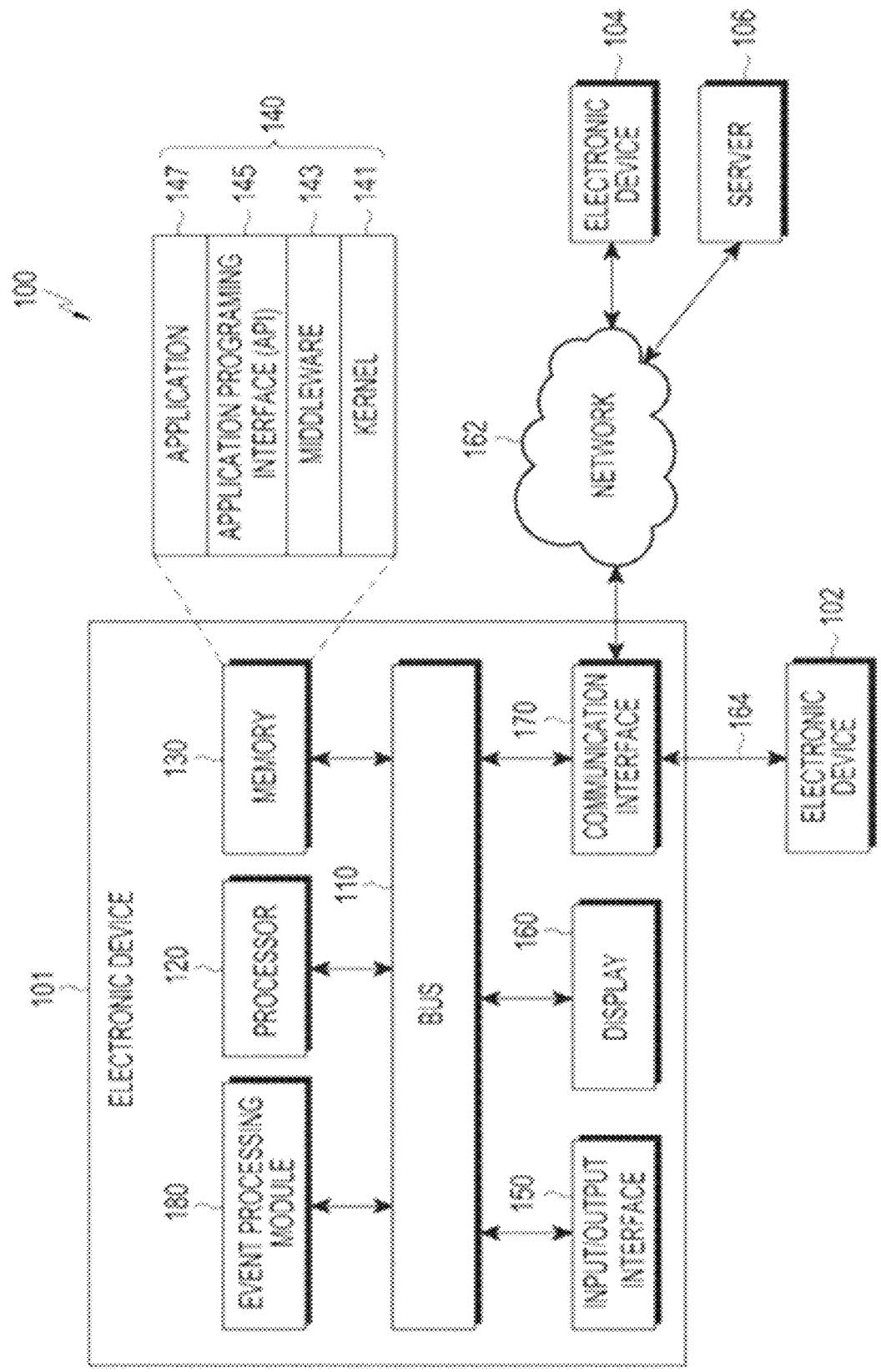
FIG. 1 illustrates an example system according to this disclosure.

FIG. 1 illustrates an example system according to an embodiment of the invention. Referring to FIG. 1, according to an embodiment of the present disclosure, an electronic device 101 is included in a network environment 100. The electronic device 101 may include at least one of a bus 110, a processor 120, a memory 130, an input/output interface 150, a display 160, a communication interface 170, or an event processing module 180. In some embodiments, the electronic device 101 may exclude at least one of the components or may add another component.

The bus 110 may include a circuit for connecting the components 120 to 180 with one another and transferring communications (e.g., control messages and/or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 or 164 through wireless or wired communication to communicate with the external electronic device.

The first external electronic device 102 or the second external electronic device 104 may be a wearable device or a wearable device in which electronic device 101 can be mounted (e.g., a head mounted/mountable display (HMD)). When the electronic device 101 is mounted in a HMD (e.g., the electronic device 102), the electronic device 101 may detect the mounting in the HMD and operate in a virtual reality mode. When the electronic device 101 is mounted in the electronic device 102 (e.g., the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS).

The network 162 may include at least one of communication networks, e.g., a computer network (e.g., local area network (LAN) or wide area network (WAN)), Internet, or a telephone network.

According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. For example, the other electronic device may perform face detection, quick stereo estimation, image similarity determination, or stereo detection of monoscopic content as described in further detail below. The electronic device 101 may provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or server 106 via the network 162, the electronic device 101 may be independently operated without a separate communication function, according to an embodiment of the present invention. That is, all functions described below may be performed by the electronic device 101 without aid from the other electronic devices 102 and 104 or the server 106.

The server 106 may support to drive the electronic device 101 by performing at least one of operations (or functions) implemented on the electronic device 101. For example, the server 106 may include an event processing server module (not shown) that may support the event processing module 180 implemented in the electronic device 101. For example, the event processing server module may include at least one of the components of the event processing module 180 and perform (or instead perform) at least one of the operations (or functions) conducted by the event processing module 180.

The event processing module 180 may process at least part of information obtained from other elements (e.g., the processor 120, the memory 130, the input/output interface 150, or the communication interface 170) and may provide the same to the user in various manners. For example, according to an embodiment of the present invention, the event processing module 180 may process information related to an event, which is generated while the electronic device 101 is mounted in a wearable device (e.g., the electronic device 102) to function as a display apparatus and to operate in the virtual reality mode, to fit the virtual reality mode and display the processed information. When the event generated while operating in the virtual reality mode is an event related to running an application, the event processing module 180 may determine whether the application is a stereo application or a non-stereo application. Additional information on the event processing module 180 may be provided through FIG. 2 described below.

Although FIG. 1 illustrates one example of a system including an electronic device 101 various changes may be made to FIG. 1. For example, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of the present invention in interoperation with at least one program 140 stored in the memory 130.

Figure 2:
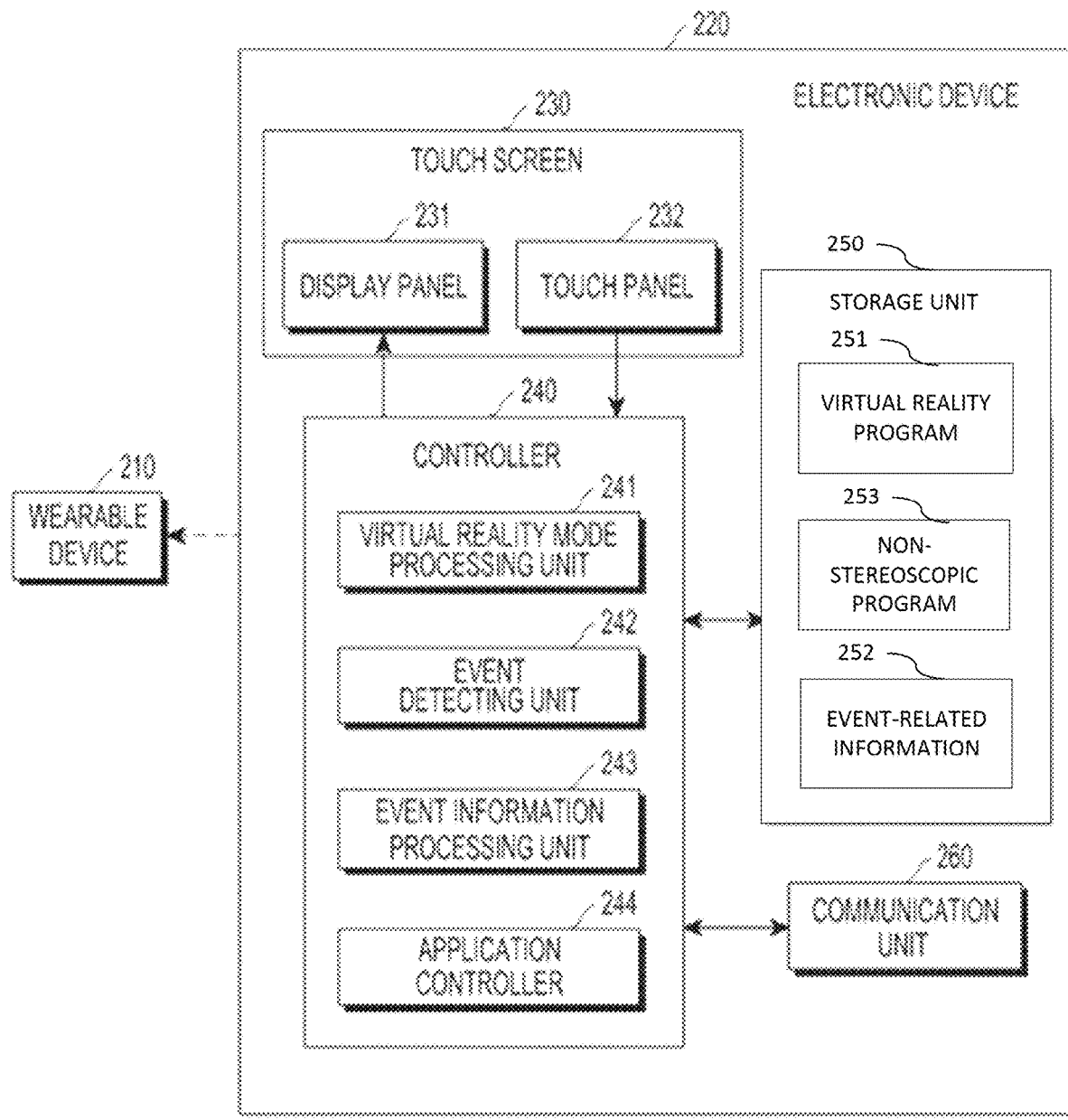
FIG. 2 illustrates an example electronic device according to this disclosure.

FIG. 2 illustrates an example electronic device according to an embodiment of the invention. The electronic device 220 may, in come embodiments, be the electronic device 101 of FIG. 1, which may be a device capable of rendering stereo images to create a virtual reality experience. In some embodiments, the electronic device 220 could be an external electronic device, such as electronic device 102 or 104 or server 106. It is understood that the electronic device 220 may be any appropriate electronic device for displaying stereo images.

Referring to FIG. 2, the electronic device 220 according to an embodiment of the present invention may have at least one display means. In the following description, the electronic device 220 may be a device primarily performing a display function or may denote a normal electronic device that includes at least one display means and performs additional functions. For example, the electronic device 220 may be a mobile electronic device such as a mobile phone.

According to an embodiment of the present invention, the electronic device 220 may include at least one of a touchscreen 230, a controller 240, a storage unit 250, or a communication unit 260. The touchscreen 230 may include a display panel 231 and/or a touch panel 232. The controller 240 may include at least one of a virtual reality mode processing unit 241, an event detecting unit 242, an event information processing unit 243, or an application controller 244.

In some embodiments, when the electronic device 220 is mounted in a wearable device 210, such as an HMD, the electronic device 220 may run a virtual reality mode. Further, according to an embodiment of the present invention, even when the electronic device 220 is not mounted in the wearable device 210, the electronic device 220 may run the virtual reality mode according to the user's settings, or may run a virtual reality mode related application. Although in the following embodiment the electronic device 220 is set to be mounted in the wearable device 210 to run in a virtual reality mode, other embodiments of the present invention are not limited thereto.

According to an embodiment of the present disclosure, when the electronic device 220 operates in the virtual reality mode (e.g., the electronic device 220 is mounted in the wearable device 210 to operate in a head mounted theater (HMT) mode), the display panel 231 may functionally operate as two screens, each corresponding to one of the operator's eyes. In this embodiment, the display panel 231 is oriented horizontally (i.e., with a long edge of the device parallel to the ground), and is split into a left half and a right half, each of which displays one portion of a stereo image. The right and left portion of the stereo image are designed to be complementary, such that the operator experiences the illusion of seeing a 3D image when each eye sees only one portion of the stereo image. To this end, the wearable device 210 may contain lenses that focus each half of the display 231 (and accordingly, each portion of the stereo image) onto one of the operator's eyes, thereby creating the illusion of a 3D image.

According to an embodiment of the present invention, when the electronic device 220 is operated in the virtual reality mode, the controller 240 may perform control to process information related to an event generated while operating in the virtual reality mode to fit the virtual reality mode and display the processed information. According to an embodiment of the present invention, when the event generated while operating in the virtual reality mode is an event related to running an application, the controller 240 may determine whether the application is a stereo or a non-stereo application.

More specifically, according to an embodiment of the present invention, the controller 240 may include at least one of a virtual reality mode processing unit 241, an event detecting unit 242, an event information processing unit 243, or an application controller 244 to perform functions according to various embodiments of the present invention. An embodiment of the present invention may be implemented to perform various operations or functions as described below using at least one component of the electronic device 220 (e.g., the touchscreen 230, controller 240, or storage unit 250).

According to an embodiment of the present invention, when the electronic device 220 is mounted in the wearable device 210, or the virtual reality mode is run according to the operator's setting, the virtual reality mode processing unit 241 may process various functions related to the operation of the virtual reality mode. The virtual reality mode processing unit 241 may load at least one virtual reality (or stereo) program 251 stored in the storage unit 250 to perform various functions. The virtual reality mode processing unit 241 may additionally or alternatively load at least one non-stereo program 253 stored in the storage unit 250 to perform various functions.

The event detecting unit 242 may determine an event generated while operated in the virtual reality mode by the virtual reality mode processing unit 241. For example, the event detecting unit 242 may determine when an application such as a virtual reality program 251 or a non-stereo program 253 requests to display an image on the display panel 231. Various methods for processing the event may apply. For example, the event detecting unit 242 may determine whether the image is a stereo image or a non-stereo image via icon detection, quick stereo estimation, The event information processing unit 243 may process the event-related image to be displayed on the screen to fit the virtual reality mode depending on the result of a determination by the event detecting unit 242. Various methods for processing the event-related image may apply. For example, a three-dimensional (3D) image is implemented in the virtual reality mode, the electronic device 220 may convert the event-related information to fit the 3D image. For example, event-related information being displayed in two dimensions (2D) may be converted into information corresponding to the left and right eye corresponding to the 3D image, and the converted information may be synthesized and displayed on the screen of the virtual reality mode being currently run.

When it is determined by the event detecting unit 242 that there is an application to be run in relation with the event occurring while operating in the virtual reality mode, the application controller 244 may perform control to block the running of the application related to the event. According to an embodiment of the present invention, when it is determined by the event detecting unit 242 that there is an application to be run in relation with the event occurring while operating in the virtual reality mode, the application controller 244 may perform control so that the application is run in the background not to influence the running or screen display of the application corresponding to the virtual reality mode when the event-related application runs.

The storage unit 250 may store at least one virtual reality program 251. The virtual reality program 251 may be an application related to the virtual reality mode operation of the electronic device 220. The storage unit 250 may also store event-related information 252. The event detecting unit 242 may reference the event-related information 252 stored in the storage unit 250 to determine whether the occurring event is displayed on the screen or identify information on the application to be run in relation with the occurring event. The storage unit 250 may further store at least one non-stereo program 253. The non-stereo program 253 may be an application related to a normal (or non-virtual reality) mode operation of the electronic device 220.

The wearable device 210 may be an electronic device including at least one function of the electronic device 101 shown in FIG. 1, and the wearable device 210 may be a wearable stand to which the electronic device 220 may be mounted. In case the wearable device 210 is an electronic device, when the electronic device 220 is mounted on the wearable device 210, various functions may be provided through the communication unit 260 of the electronic device 220. For example, when the electronic device 220 is mounted on the wearable device 210, the electronic device 220 may detect whether to be mounted on the wearable device 210 for communication with the wearable device 210 and may determine whether to operate in the virtual reality mode (or an HMT mode).

At least some functions of the controller 240 shown in FIG. 2 may be included in the event processing module 180 or processor 120 of the electronic device 101 shown in FIG. 1. The touchscreen 230 or display panel 231 shown in FIG. 2 may correspond to the display 160 of FIG. 1. The storage unit 250 shown in FIG. 2 may correspond to the memory 130 of FIG. 1.

Although FIG. 2 illustrates one example of an electronic device, various changes may be made to FIG. 2. For example, the display panel 231 or the touch panel 232 may also be provided as a separate panel rather than being in a single touchscreen 230. Furthermore, the electronic device 220 may include the display panel 231 but exclude the touch panel 232.

Figure 3:
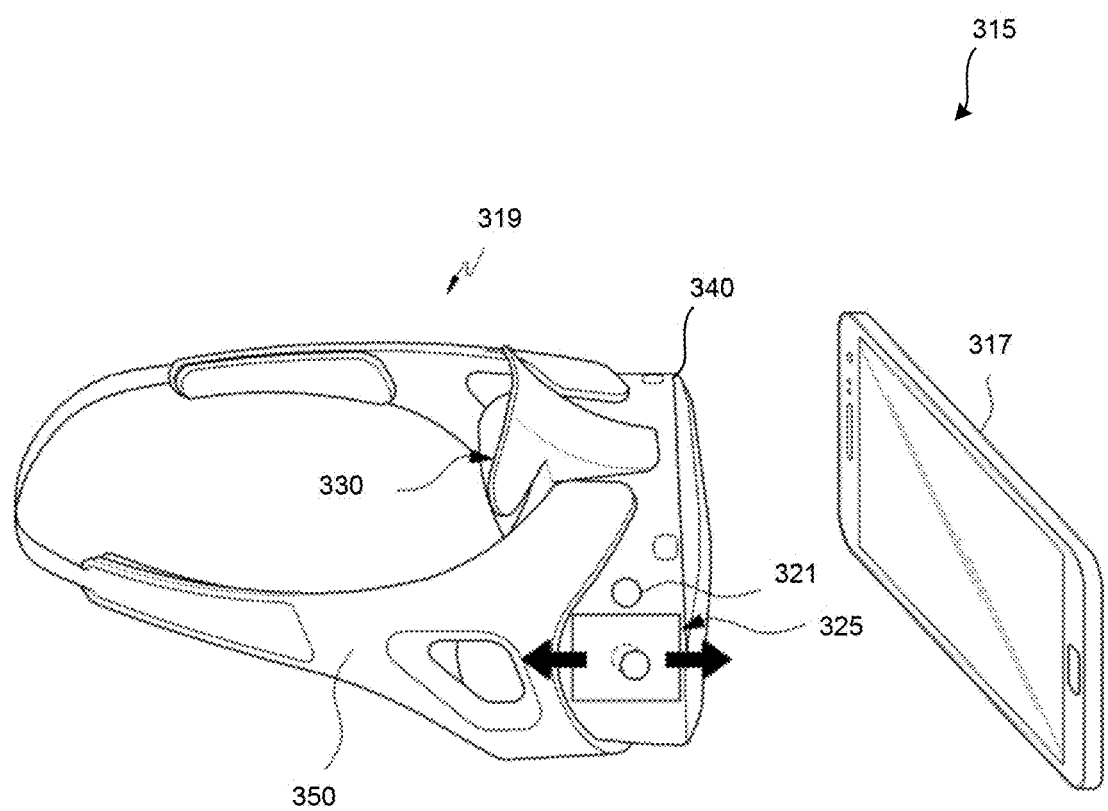
FIG. 3 illustrates an example HMD system according to this disclosure.

FIG. 3 illustrates an example HMD system according to an embodiment of the invention. For example, the HMD system 315 of FIG. 3 may be the electronic device 220 of FIG. 2, the electronic device 101 of FIG. 1, or a combination of those electronic devices with other devices, such as first external electronic device 102 of FIG. 1 or wearable device 210 of FIG. 2. It is understood that the HMD system 315 may be any other appropriate HMD system for displaying stereo images.

The HMD system 315 may include an electronic device 317 and an electronic device 319 according to an embodiment of the present disclosure. The electronic device 317 may include a display, such as touchscreen 230, that is capable of displaying both stereo and non-stereo images. The electronic device 317 may store a virtual reality application, such as virtual reality program 251. The virtual reality application may be an application which can provide images similar to an actual reality to the user. According to an embodiment, the virtual reality application may display a left eye image and a right eye image corresponding to each of the user's eyes based in a stereo scheme. The electronic device 317 may also store a non-stereo application, such as non-stereo program 253. The non-stereo application may display a single image across the display of the electronic device 317 (i.e., it does not include a left eye image and a right eye image).

The electronic device 319 according to an embodiment may include a housing 340 provided to be worn on the user's head, a light seal component 330 attached to the housing and provided at an area corresponding to locations of the user's eyes, and at least one input button 321 provided at one area of the housing 450. The electronic device 319 may include an input pad 325 which may receive an input from the user such as a swipe, tap, or other input performed by a user. The electronic device 319 may be secured on the user's head using a strap 350.

The light seal component 330 provides a seal against external light from entering the space between a user's eyes and the electronic device 317. Thus, the user may position the user's eyes to fit closely to the light seal component 330 and, accordingly, the user may view the image by the virtual reality application provided from the electronic device 317 without any interference from external, or ambient, light. Various suitable configurations of the light seal component 330 may be used to prevent external, or ambient, light from interfering with the user's ability to view the display of the electronic device 317.

The electronic device 317 may be coupled to the electronic device 319, both physically and electrically. The electronic device 317 may be physically coupled to the electronic device 319 by various mechanisms such as clamps, clips, magnets, straps, reusable adhesives, elastics, a cover that seals around the electronic device 317, or any other suitable physical coupling mechanism. The electronic device 317 may be electrically connected to the electronic device 319 through a wire or wirelessly. It is understood that there is no limitation on the connection if data transmission/reception between the two devices 317 and 319 is possible through the connection. According to another embodiment, the electronic device 317 may be directly coupled to the electronic device 319 without the use of a wire or wireless connection. For example, the electronic devices 317 and 319 may couple directly via a compatible port.

Although FIG. 3 illustrates one example of an HMD system, various changes may be made to FIG. 3. For example, the electronic device 319 may include all functions of the electronic device 317 integrally, with no further electronic devices needed to provide the functions of embodiments of this disclosure.

Figure 4:
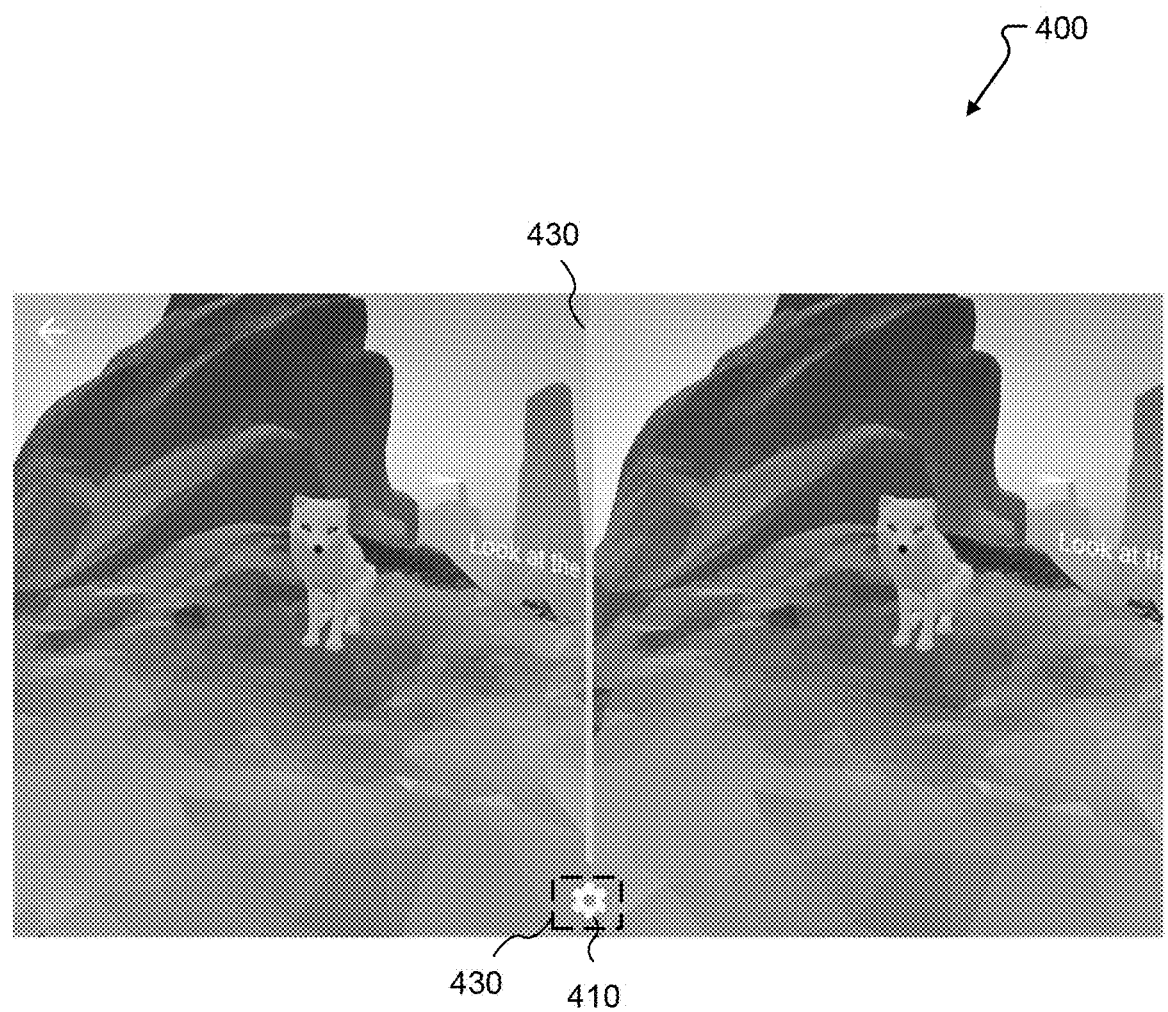
FIG. 4 illustrates an example of icon detection according to this disclosure.

FIG. 4 illustrates an example of icon detection according to a method of this disclosure. Icon detection methods may be used with any of the systems described above. Icon detection may be initiated after detection of an event detected by the event detecting unit 242. For example, upon detection of an event that corresponds to a request to display an image on the display panel 231, icon detection may be performed to determine whether the image is a stereo or a non-stereo image.

The method may utilize image processing or computer vision techniques to determine the presence of a known icon 410 within an image 400 that may indicate that the image is as a stereo content image. For example, it may be known that applications designed for the virtual reality environment of the HMD are designed with an icon (such as icon 410) in a known, standard location for accessing a settings menu. In the example shown, the settings icon 410 is at the lower center of the image 400. Common characteristics for the known icon may be utilized to determine its presence (e.g., symmetry, other shapes making up the icon, etc.).

In an example of icon detection by detecting symmetry of the icon about a center line 420, a sub-image 430 containing the icon may be obtained, then the image may be divided in half (i.e., divided into a right portion and a left portion). One half may be flipped and subtracted from the other half to find a percentage difference between the right portion and the left portion. If the difference is below a predetermined threshold (e.g., less than 10% difference), that indicates that the two halves are roughly the same, and the image may be determined to be symmetrical, and therefore a determination of successful icon detection may be made. It is understood that other appropriate threshold values may be used. For example, a threshold value may be predetermined empirically.

In some embodiments, instead of a set threshold a confidence value may be determined and related with the determination of symmetry. For example, if the percent difference is determined to be 1%, the confidence value related with a resulting determination of symmetry may be very high. If the percent difference is determined to be 10%, the confidence value related with a resulting determination of symmetry may be acceptable. If the percent difference is determined to be 20%, the confidence value related with a resulting determination of symmetry may be low. It is understood that this is an example, and any confidence values may be used.

In an example of icon detection by detecting shapes (e.g., the circle within the cog of icon 410), a shape detector in an image recognition method may be utilized to find the number of enclosed shapes within a given dimension information. The dimension information may be determined from the known information about the expected size, shape, and location of the icon 410. A predetermined list of expected shapes may be compared to any detected shapes. For example, a Hough circle transform may be used to detect circles within the icon 410. If the expected shape (in this case, a single circle), is found within the icon 410, a determination of successful icon detection may be made.

Although FIG. 4 illustrates one example of icon detection, various changes may be made to FIG. 4. For example, the icon need not be in the center of a stereo image.

Figure 5:
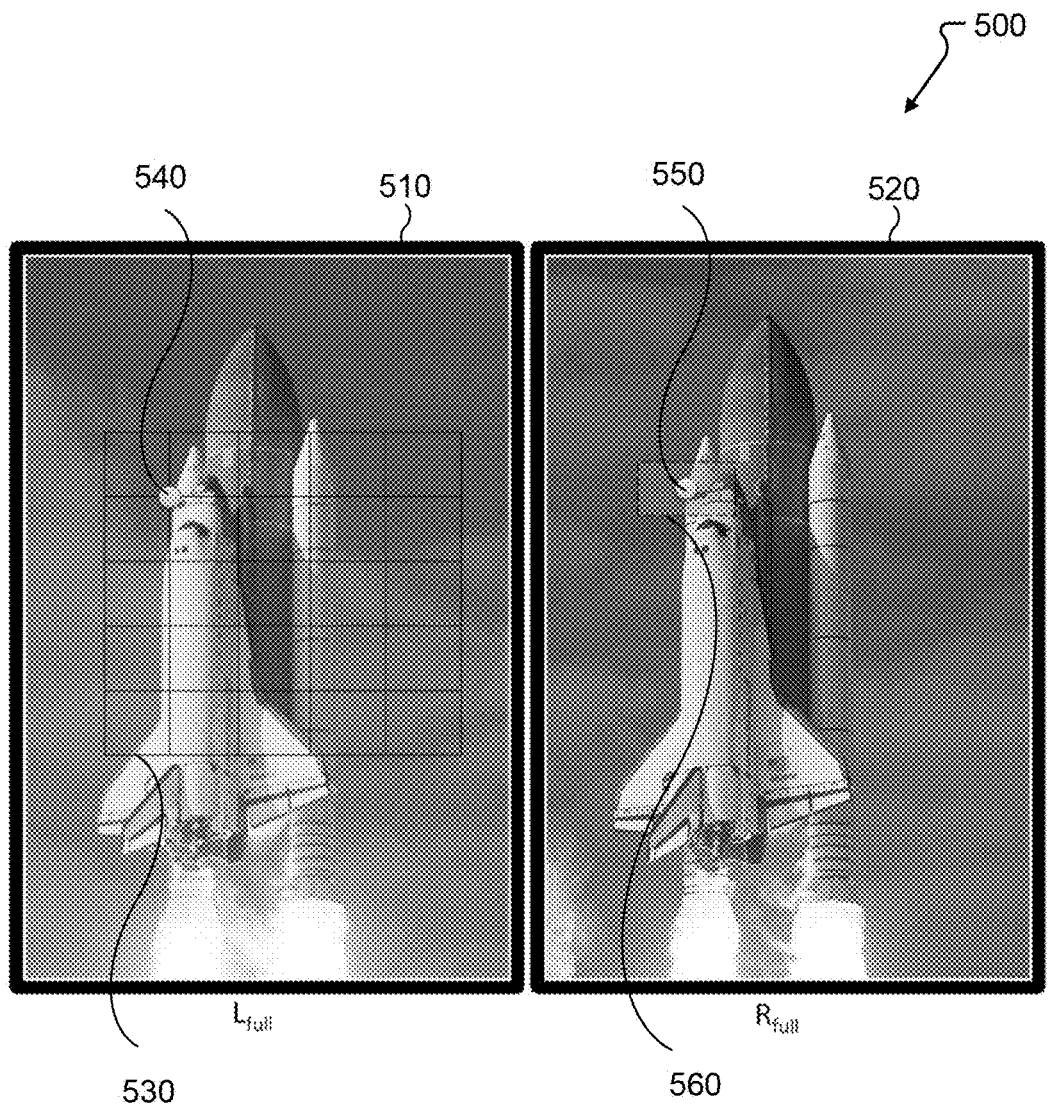
FIG. 5 illustrates an example of quick stereo estimation according to this disclosure.

FIG. 5 illustrates an example of quick stereo estimation according to this disclosure. Quick stereo estimation (QSE) methods may be used with any of the systems described above. Quick stereo estimation may be initiated after detection of an event detected by the event detecting unit 242. For example, upon detection of an event that corresponds to a request to display an image on the display panel 231, quick stereo estimation may be performed to determine whether the image is a stereo or a non-stereo image.

The method may divide the overall image 500 into a left half (or portion) 510 and a right half (or portion) 520. In some embodiments, the left half 510 and the right half 520 are converted from red, green, and blue (RGB) color space to hue, saturation, and value (HSV) color space, and may be downsampled to a predefined resolution that is lower than an original resolution of the image. Each half 510 and 520 may be reshaped into a one-dimensional vector, and a correlation coefficient may be calculated for the one-dimensional vector representations of each half 510 and 520. If the correlation coefficient is below a predetermined threshold, it indicates a lack of similarity between the left half 510 and the right half 520, which in turn indicates that the image is a non-stereo image. If the correlation coefficient is above the predetermined threshold, it is implied that the image is a stereo image.

In some embodiments, a further comparison between the original resolution versions of the left half 510 and the right half 520 may be performed to confirm that the image is a stereo image. A grid 530 is overlaid on one half (for example the left half 510) of the overall image 500. Sample patches, such as sample patch 540, may be located on the intersections of the grid. In some embodiments, a sample patch 540 is comprised of a set number of pixels of the image. For example, sample patch 540 may comprise R rows and K columns of pixels. In some embodiments, the grid size may have a number of rows $G_r$, a number of columns $G_c$. The values of R, K, $G_r$, and $G_c$ may be determined so as to balance efficiency of calculation with accuracy of results. In some embodiments, sample patches may be removed from consideration if they are not considered informative. For example, if a number of edges detected in the sample patch is below a predetermined threshold, the sample patch may be considered not to be informative.

Corresponding patches may be searched for on the right half 520 of the image. For example, a corresponding set of pixels in a candidate patch 550 in the right half 520 may be compared to the pixels of sample patch 540. The candidate patch 550 may be in a neighborhood 560 within the right half 520, and may not be at exactly the same position as the sample patch 540. The neighborhood 560 may have a predetermined size in pixels, and may be centered on the area in the right half 520 that corresponds to the sample patch 540. The neighborhood 560 is searched due to the nature of stereo images, wherein the left half 510 and right half 520 of the image 500 will be similar, but not identical. In particular, each half will contain most of the same information, but in slightly different positions.

In some embodiments, the pixel values of candidate patches 550 with a same pixel area as the pixel area of patch 540 are compared to the pixel values of sample patch 540, and if the similarity between the patches surpasses a predetermined threshold, candidate patch 550 is determined to correspond to sample patch 540. Found corresponding patches may increase a score for determining whether the image is a stereo image. Once a corresponding patch is found, a new sample patch 540 may be selected and a search for candidate patches 550 may be performed in a new neighborhood 560. Further details for the process are described below.

In some embodiments, instead of a set threshold a confidence value may be determined and related with the determination of corresponding patches. For example, if the percent difference between the pixel values of a sample patch 540 and a target patch 550 is determined to be 1%, the confidence value related with a resulting determination that the patches correspond to each other may be very high. If the percent difference is determined to be 10%, the confidence value related with a resulting determination that the patches correspond to each other may be acceptable. If the percent difference is determined to be 20%, the confidence value related with a resulting determination that the patches correspond to each other may be low. It is understood that this is an example, and any confidence values may be used.

In some embodiments, a preliminary search of squares of the grid 530 may be made to determine whether any of the grid squares do not contain much variation (i.e., to determine whether the grid square is mostly a solid color). Such squares may not provide much useful information for comparison of one half to the other, and they may be excluded from the search for corresponding patches. In some embodiments, this determination is made by a number of edges (or transitions) between colors in the square.

Although FIG. 5 illustrates one example of a quick stereo estimation technique, various changes may be made to FIG. 5. For example, in some embodiments the number of pixels in a first half of the image for which corresponding candidate pixels are searched for in the other half of the image may be reduced to a single column of pixels.

Figure 6:
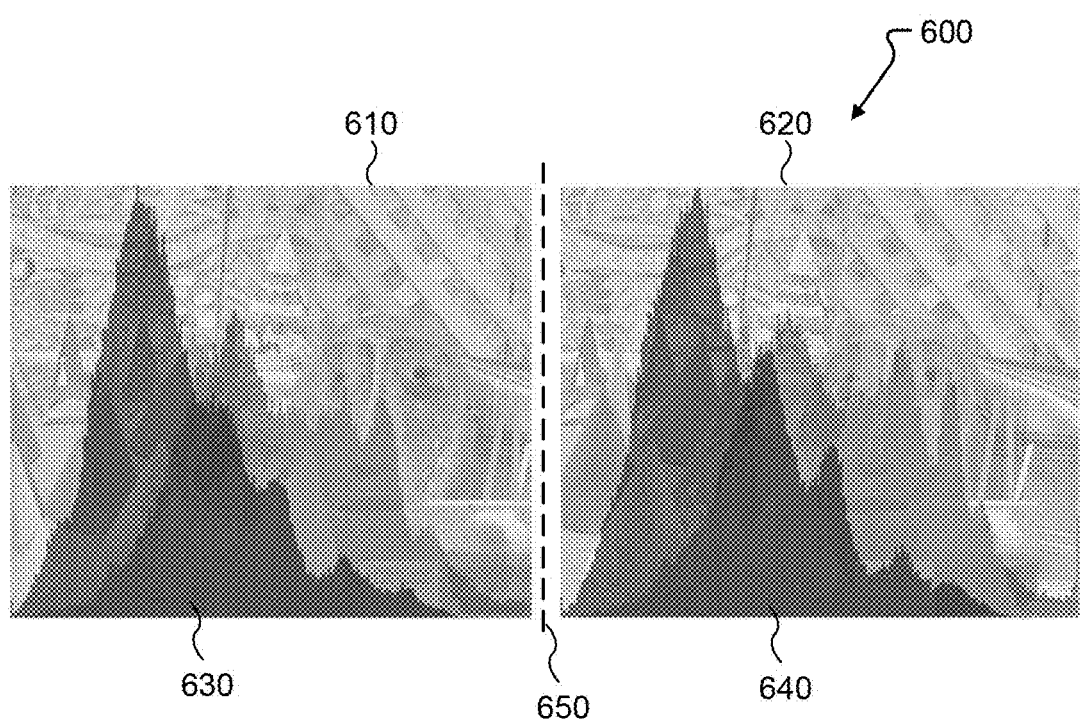
FIG. 6 illustrates an example image similarity determination according to this disclosure.

FIG. 6 illustrates an example of image similarity determination according to an embodiment of the invention. Image similarity determination methods may be used with any of the systems described above. Image similarity determination may be initiated after detection of an event detected by the event detecting unit 242. For example, upon detection of an event that corresponds to a request to display an image on the display panel 231, image similarity determination may be performed to determine whether the image is a stereo or a non-stereo image.

This embodiment utilizes an image histogram, which is a computation of the distribution of pixel values (such as the RGB values of the pixels) in an image. After dividing the full display image 600 into a left half (or portion) 610 and a right half (or portion) 620, the histogram of each half is computed. As illustrated, the left half histogram 630 is overlaid on the left half 610 of the image, and the right half histogram 640 is overlaid on the right half 620 of the image. It is understood that this overlay is for illustrative purposes, and the histograms 630 and 640 are analyzed separately from the underlying left half 610 and right half 620 of the image. As noted above, the left half 610 and right half 620 of a stereo image will be similar, but not 100% similar, due to the nature of stereo image displays. Accordingly, the histograms 630 and 640 are compared, and if the percent similarity surpasses a predetermined threshold, a preliminary determination is reached that the image 600 is a stereo image.

In some embodiments, histograms 630 and 640 may be similar but the content of left half 610 and right half 620 do not form a stereo image. Specifically, this is the case when the image 600 is a non-stereo image that happens to have reflection symmetry about the center line 650 (i.e., when the left half 610 and right half 620 are mirror images of each other). In this case, the histograms 630 and 640 will be very similar as the RGB content of each half will be nearly identical, even though the left half image 610 and right half image 620 are actually mirror images of each other rather than nearly identical copies. That is to say, the RGB content of an image remains the same even when it is flipped, so histograms cannot detect such flipping. In order to check for this case, symmetry detection may be used. For example, one half 610 or 620 may be flipped and subtracted from the other half 620 or 610, and the resulting percentage difference between the right portion and the left halves can be compared to a predetermined threshold. If the difference is below a predetermined threshold (e.g., less than 10% difference), that indicates that the two halves are roughly the same, and the image may be determined to be a symmetrical non-stereo image. In some embodiments, a confidence value may be determined and related with the determination of image similarity, in a similar manner as described above with respect the FIGS. 4 and 5.

Although FIG. 6 illustrates one example of image similarity determination, various changes may be made to FIG. 6. For example, other methods such as quick stereo estimation may be used to check for symmetry between the left and right halves of the image in order to avoid a situation where the left half image 610 and the right half image 620 do not form a stereo image.

Figure 7:
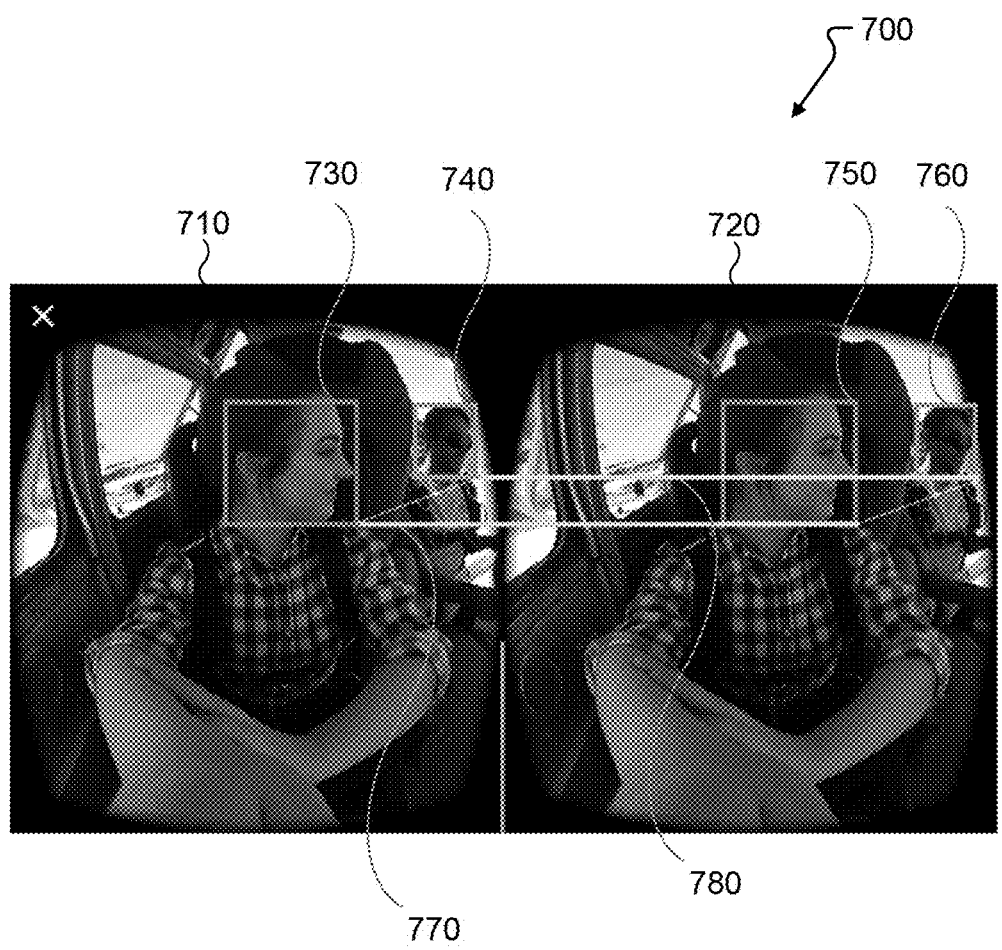
FIG. 7 illustrates an example of stereo detection of monoscopic content according to this disclosure.

FIG. 7 illustrates an example of stereo detection of monoscopic content according to an embodiment of the invention. Methods of stereo detection of monoscopic content may be used with any of the systems described above. Stereo detection of monoscopic content may be initiated after detection of an event detected by the event detecting unit 242. For example, upon detection of an event that corresponds to a request to display an image on the display panel 231, stereo detection of monoscopic content may be performed to determine whether the image is a stereo or a non-stereo image.

There are generally two ways of creating virtual reality content: monoscopic and stereoscopic generation. Monoscopic generation uses images for the left and right eye that are generated from the same vantage point (i.e., from one camera) and the depth experienced in a stereo image created from monoscopic generation is actually constant everywhere in the image. As a result, an object will be in the same position on each half of a monoscopically generated stereo image. Stereoscopic generation uses images for the left and right eyes that are generated from different vantage points (i.e., using two cameras), and the depth experienced in a stereo image created from stereoscopic generation is similar to the depth experienced by humans in the real world. That is to say, the depth of an object is different depending on an object's distance from the camera. As a result, objects are in slightly different positions relative to each other in each half of a stereoscopically generated stereo image. It may be useful to determine whether a stereo image was generated from monoscopic or stereoscopic content to allow for better processing of the image for display in an HMD or other appropriate stereo display.

Monoscopic content is typically generated from a single image and a predefined depth, and therefore a given region of the left eye image would correspond to the same region (i.e., the same location) in the right eye image. Monoscopic content, such as image 700, may therefore be detected by first selecting at least two regions 730 and 740 of the left half image 710 that are at different depths, finding corresponding regions 750 and 760 of the right half image 720, and determining if the regions 730 and 740 are the same distance from their corresponding regions 750 and 760 (i.e., determining whether the distances 770 and 780 are the same). It is understood that the corresponding regions may be located, for example, using quick stereo estimation, edge detection, or any other suitable technique.

In an embodiment, an object (such as the woman's face) in each of regions 730 and 750 is identified, and used to determine the distance 770 between the objects shown on a display. Similarly, an object (such as the man's face) in each of regions 740 and 760 is identified to determine the distance 780 between these objects shown on a display. If the distances 770 and 780 are the same or nearly the same, then it may be determined that the image 700 was created with monoscopic generation.

Although FIG. 7 illustrates one example of stereo detection of monoscopic content, various changes may be made to FIG. 7. For example, it should be noted that although the above illustrations are shown in two dimensions, the zones are often three dimensional. It also should be noted that for clarity and ease of illustration, the figures are not necessarily made to scale.

Figure 8:
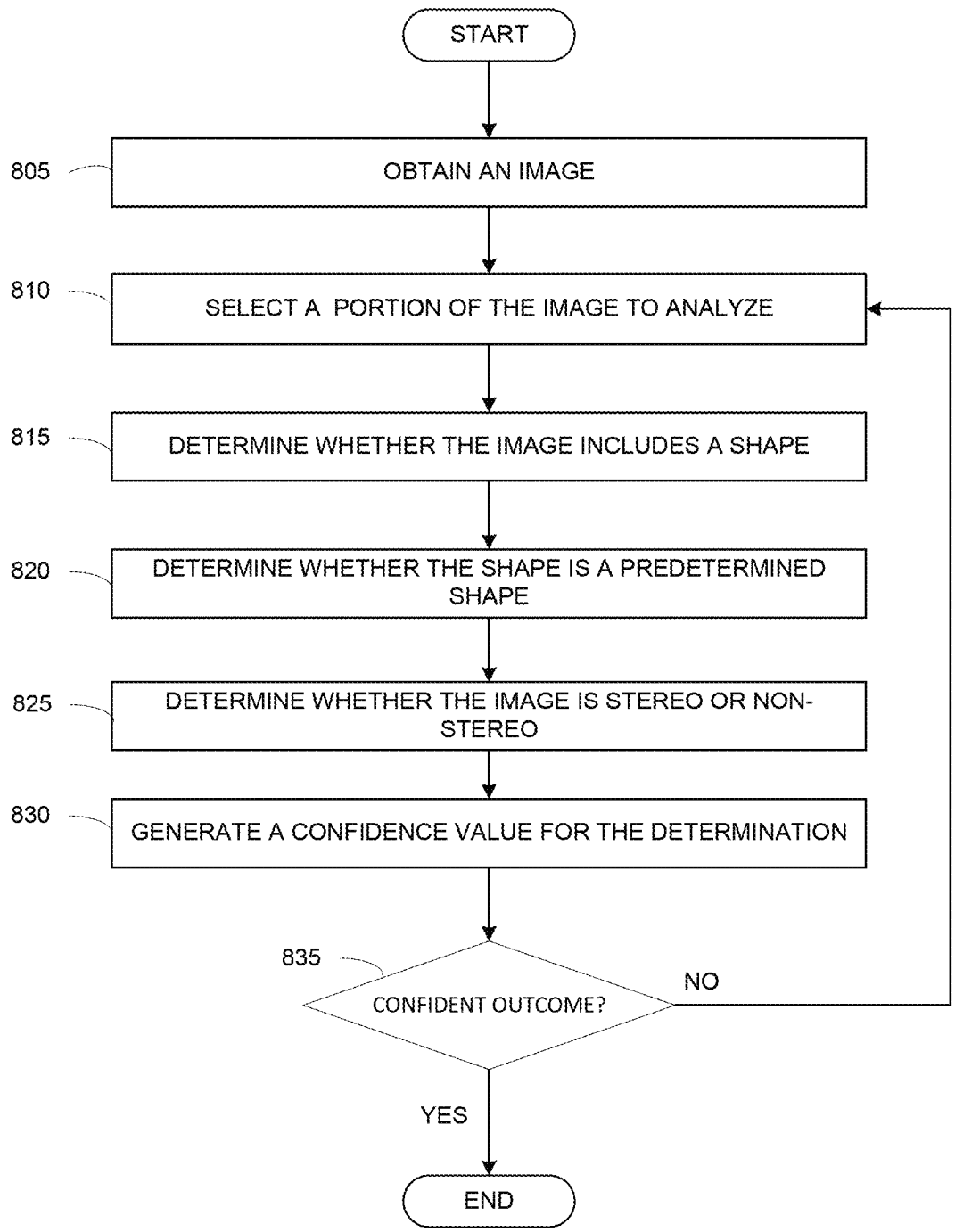
FIG. 8 illustrates an example process for icon detection by shape recognition in accordance with various embodiments of the present disclosure.

FIG. 8 illustrates an example process for icon detection by shape recognition in accordance with various embodiments of the present disclosure. In some embodiments, the process of FIG. 8 may be performed by the electronic device 101, the electronic device 220, the HMD system 315, or any other suitable system capable of displaying stereo or non-stereo images. For simplicity, the process will be described as performed by an electronic device.

The process begins with the electronic device obtaining an image at step 805. The image may be obtained in various ways, for example by receiving the image from an external source, by extracting a frame from video content, or the like. The process is directed at determining whether the image is a stereo or a non-stereo image. The electronic device then, at step 810, selects a portion of the image to analyze. In some embodiments, the selected portion may be a predetermined portion. For example, a standard may dictate that a specific icon (such as a settings menu icon) be displayed in a same position across all virtual reality applications developed for the electronic device. In other embodiments, there may be multiple portions of the image that contain identifiable icons. In such a case, the electronic device may feasibly determine whether the image is a stereo image (for use in a virtual reality environment) based on whether or not the expected icon is present.

The electronic device then determines whether the predetermined portion of the image includes at least one shape at step 815. For example, the icon may be a gear-shaped icon. In further embodiments, the gear-shaped icon may include a circular shape in the center representing a hole in the gear. The electronic device may determine whether the image includes the gear shape by, for example, edge detection, recognizing a characteristic edge pattern of the gear-shaped icon. In some embodiments, the electronic device may determine whether a circle exists within the gear-shaped icon, for example by using a Hough circle transform.

Thereafter, the electronic device may determine whether the detected shape is a predetermined (i.e., expected) shape at step 820. For example, the electronic device may contain a table or list of possible shapes of icons displayed in the predetermined portion of the image. If a shape is found in step 815, and the shape matches a shape in the table or list of electronic device, the electronic device may determine that the detected shape is the predetermined shape. In some embodiments, this leads to a determination that the image is a stereo image at step 825. Similarly, if no shape is detected, or if a shape is detected but does not match the table or list of the electronic device, this leads to a determination that the image is a non-stereo image.

The electronic device may next generate a confidence value for the determination of whether the image is a stereo or non-stereo image at step 830. For example, a Hough circular transform may produce a confidence interval or confidence value when reporting that a circle has been detected. This value may either directly be used or may be used to generate a different confidence value for the determination.

The electronic device may then, at step 835, determine whether the confidence value is acceptable. For example, the electronic device may determine whether the confidence value exceeds a predetermined threshold at which it is confident that the image either is or is not a stereo image. If the confidence value is not acceptable, the process may return to step 810 and select a new portion of the image to analyze. If the confidence value is acceptable, the process may end.

Figure 9:
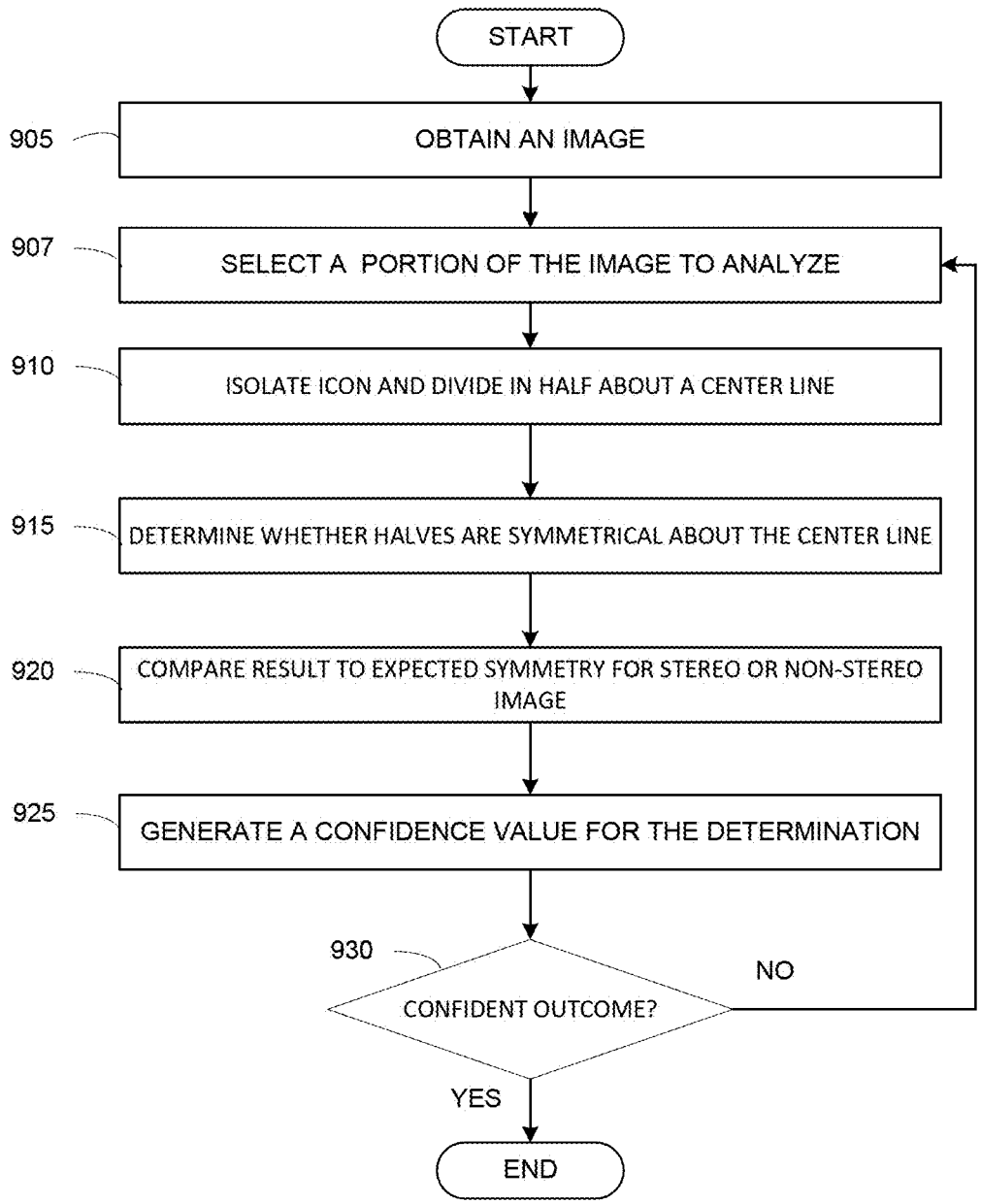
FIG. 9 illustrates an example process for icon detection by symmetry in accordance with various embodiments of the present disclosure.

FIG. 9 illustrates an example process for icon detection by symmetry in accordance with various embodiments of the present disclosure. In some embodiments, the process of FIG. 9 may be performed by the electronic device 101, the electronic device 220, the HMD system 315, or any other suitable system capable of displaying stereo or non-stereo images. For simplicity, the process will be described as performed by an electronic device.

The process begins with the electronic device obtaining an image at step 905. The image may be obtained in various ways, for example by receiving the image from an external source, by extracting a frame from video content, or the like. The process is directed at determining whether the image is a stereo or a non-stereo image. The electronic device then selects a portion of the image to analyze at step 907. In some embodiments, the selected portion may be a predetermined portion. For example, a standard may dictate that a specific icon (such as a settings menu icon) be displayed in a same position across all virtual reality applications developed for the electronic device. In other embodiments, there may be multiple portions of the image that contain identifiable icons. In such a case, the electronic device may feasibly determine whether the image is a stereo image (for use in a virtual reality environment) based on whether or not the expected icon is present. After selecting the area, at step 910, the electronic device may isolate an icon within the area, and divide the icon in half about a vertical center line.

Next, at step 915, the electronic device determines whether each half of the icon is symmetrical about the center line. For example, the electronic device may flip one half of the icon (i.e., so that if the two halves were mirror images they are now identical), and subtract the flipped half from the other half (e.g., subtract the pixel values of the flipped half from the other half).

Thereafter, at step 920, the electronic device compares the result of the subtraction to an expected result that should occur in the case of symmetry. Specifically, if the two half icons were mirror images, the result of the subtraction should be very small, or zero. As discussed above, if the icon is found to be symmetrical, this may indicate that the image is a stereo image.

Once the determination of stereo or non-stereo image is made, the electronic device may generate a confidence value for the result at step 925. For example, if the expected value of subtraction in the case of mirror symmetry is zero, then a non-zero result may indicate a non-stereo image, or it could simply indicate that the image was not quite centered. Accordingly, if the result of the subtraction is non-zero, but is small (below a predetermined threshold that accounts for various errors), a confidence value may be high, while if the value of the subtraction is large, the confidence value may be low.

The electronic device may then, at step 930, determine whether the confidence value is acceptable. For example, the electronic device may determine whether the confidence value exceeds a predetermined threshold at which it is confident that the image either is or is not a stereo image. If the confidence value is not acceptable, the process may return to step 907 and select a new portion of the image to analyze. If the confidence value is acceptable, the process may end.

Figure 10:
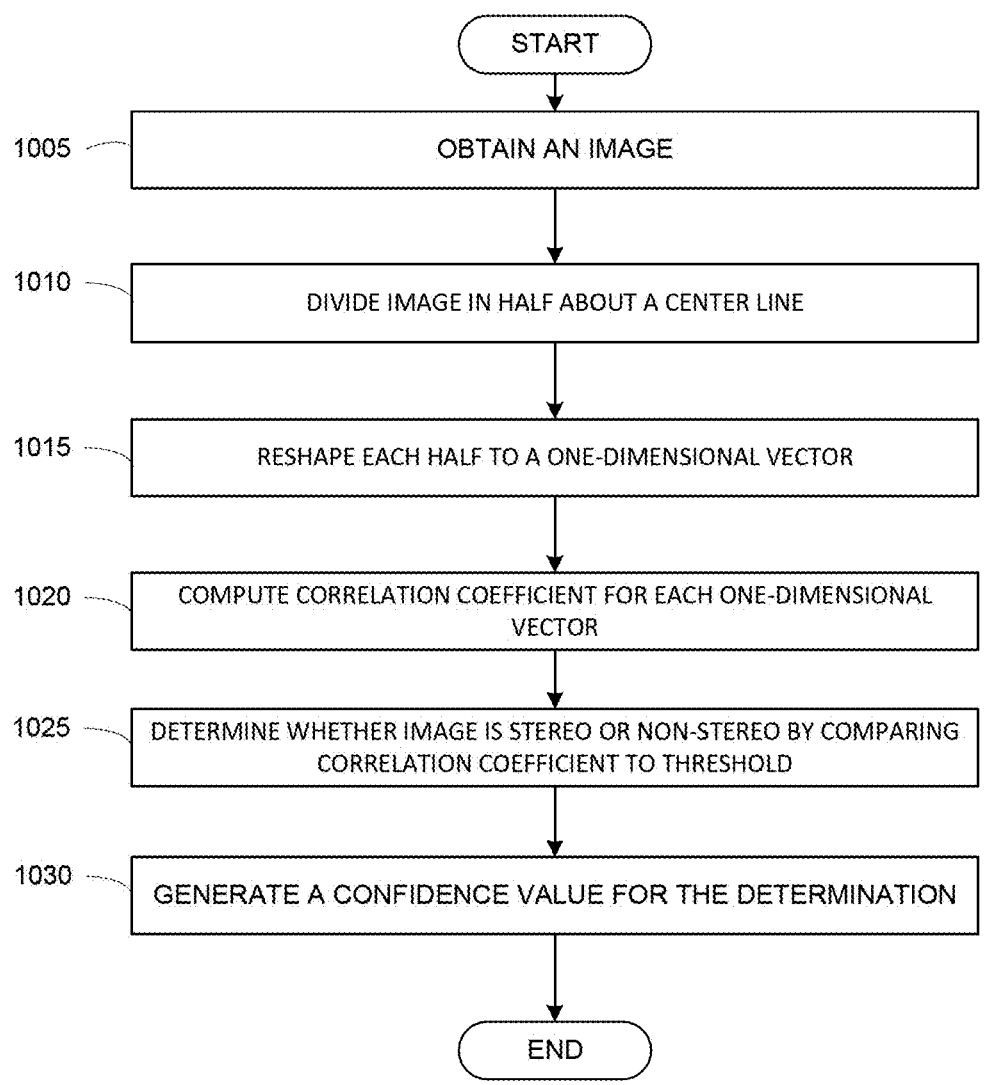
FIG. 10 illustrates an example process for quick stereo estimation in accordance with various embodiments of the present disclosure.

FIG. 10 illustrates an example process for quick stereo estimation in accordance with various embodiments of the present disclosure. In some embodiments, the process of FIG. 10 may be performed by the electronic device 101, the electronic device 220, the HMD system 315, or any other suitable system capable of displaying stereo or non-stereo images. For simplicity, the process will be described as performed by an electronic device.

The process begins with the electronic device obtaining an image at step 1005. The image may be obtained in various ways, for example by receiving the image from an external source, by extracting a frame from video content, or the like. The process is directed at determining whether the image is a stereo or a non-stereo image. The electronic device then, at step 1010, divides the image into a first half and a second half about a center line. After dividing the image in half, the electronic device at step 1015 proceeds to reshape each half into a one-dimensional vector that represents the respective half of the image. In some embodiments, before reshaping, the electronic device converts the image from an RGB colorspace to an HSV colorspace and scales the image down to a lower resolution.

Thereafter, the electronic device computes a correlation coefficient for the two one-dimensional vectors at step 1020. The electronic device, at step 1025, uses the result of the correlation coefficient calculation to determine whether the image is stereo or non-stereo. For example, if the correlation coefficient is very high (e.g., close to 1), this indicates that the two halves of the image contain very similar information, which in turn indicates that the image is a stereo image. Similarly, if the correlation coefficient is small, this indicates that the two halves of the image do not contain very similar information, which in turn indicates that the image is a non-stereo image. In some embodiments, the electronic device may use a predetermined threshold for the correlation coefficient to make the determination of whether the image is stereo or non-stereo.

Once the determination of stereo or non-stereo image is made, the electronic device may generate a confidence value for the result at step 1030. For example, if the correlation coefficient has passed the threshold but is close to the threshold, a confidence value may be acceptable but not high. If the correlation coefficient is near 1, the confidence value may be high. In some embodiments where the correlation coefficient is only acceptable, the electronic device may perform further testing to verify whether the image is stereo or non-stereo, such as that described in FIG. 11.

Figure 11:
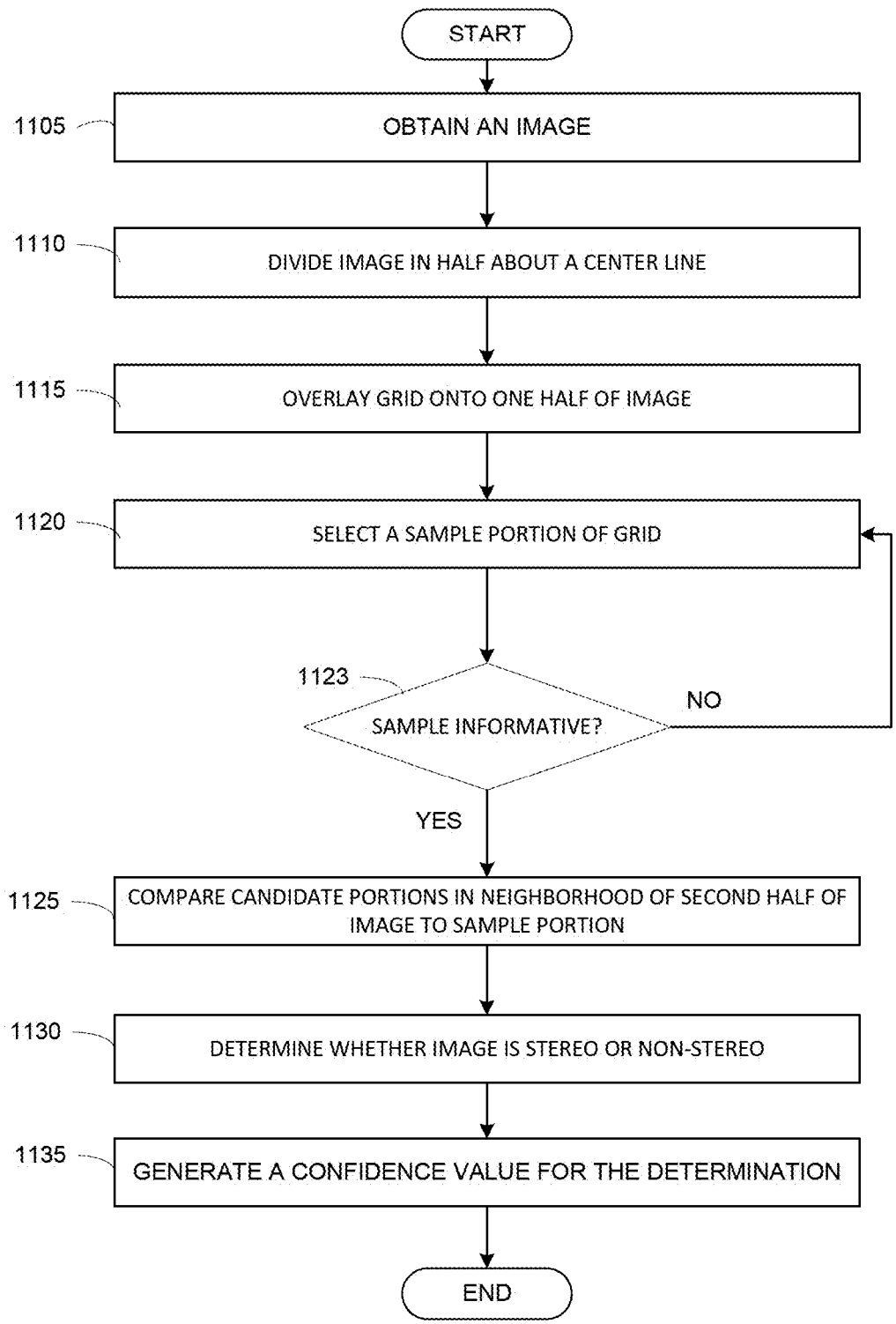
FIG. 11 illustrates an example process for quick stereo estimation in accordance with various embodiments of the present disclosure.

FIG. 11 illustrates an example process for quick stereo estimation in accordance with various embodiments of the present disclosure. In some embodiments, the process of FIG. 11 may be performed by the electronic device 101, the electronic device 220, the HMD system 315, or any other suitable system capable of displaying stereo or non-stereo images. For simplicity, the process will be described as performed by an electronic device.

The process begins with the electronic device obtaining an image at step 1105. The image may be obtained in various ways, for example by receiving the image from an external source, by extracting a frame from video content, or the like. The process is directed at determining whether the image is a stereo or a non-stereo image. The electronic device then, at step 1110, divides the image into a first half and a second half about a center line. In some embodiments, when the process of FIG. 11 is being performed after the process of FIG. 10 has been performed, steps 1105 and 1110 may already have occurred and the information from steps 1005 and 1010 of FIG. 10 may be used.

After dividing the image in half, the electronic device at step 1115 proceeds to overlay a grid onto at least a first half of the image that divides the first half of the image into a plurality of portions. At step 1120, the electronic device selects a portion of the first half to serve as a sample portion. At step 1123, the electronic device determines whether the selected sample portion is informative. For example, if a number of edges detected in the sample portion is below a predetermined threshold, the sample portion may be considered not to be informative. If the sample portion is determined not to be informative, the process returns to step 1120 and selects a new sample portion.

The electronic device then, at step 1125, searches for a candidate portion in the second half of the image that matches the sample portion in the first half of the image. In some embodiments, the electronic device searches an area (or neighborhood) around a location in the second half of the image that corresponds to the location of the sample portion in the first half of the image. The electronic device may determine that a candidate portion matches a sample portion by, for example, subtracting one from the other or comparing histograms of each portion for similarity.

At step 1130, the electronic device determines whether the image is a stereo or non-stereo image based on whether a candidate portion matching the sample portion was found. If a matching candidate portion is found, that indicates that the two halves of the image are similar, and the image is a stereo image. In some embodiments, more than one sample portion may be chosen and should be matched with a corresponding candidate portion in order to determine that the image is a stereo image. In other embodiments, the sample portion and candidate portion are not restricted to a grid, and may be, for example, a column or row of pixels of the image.

Once the determination of stereo or non-stereo image is made, the electronic device may generate a confidence value for the result at step 1135. For example, if the candidate portion is only somewhat similar to the sample portion, a confidence value may be acceptable but not high. If the candidate portion is almost entirely similar to the sample portion, the confidence value may be high.

Figure 12:
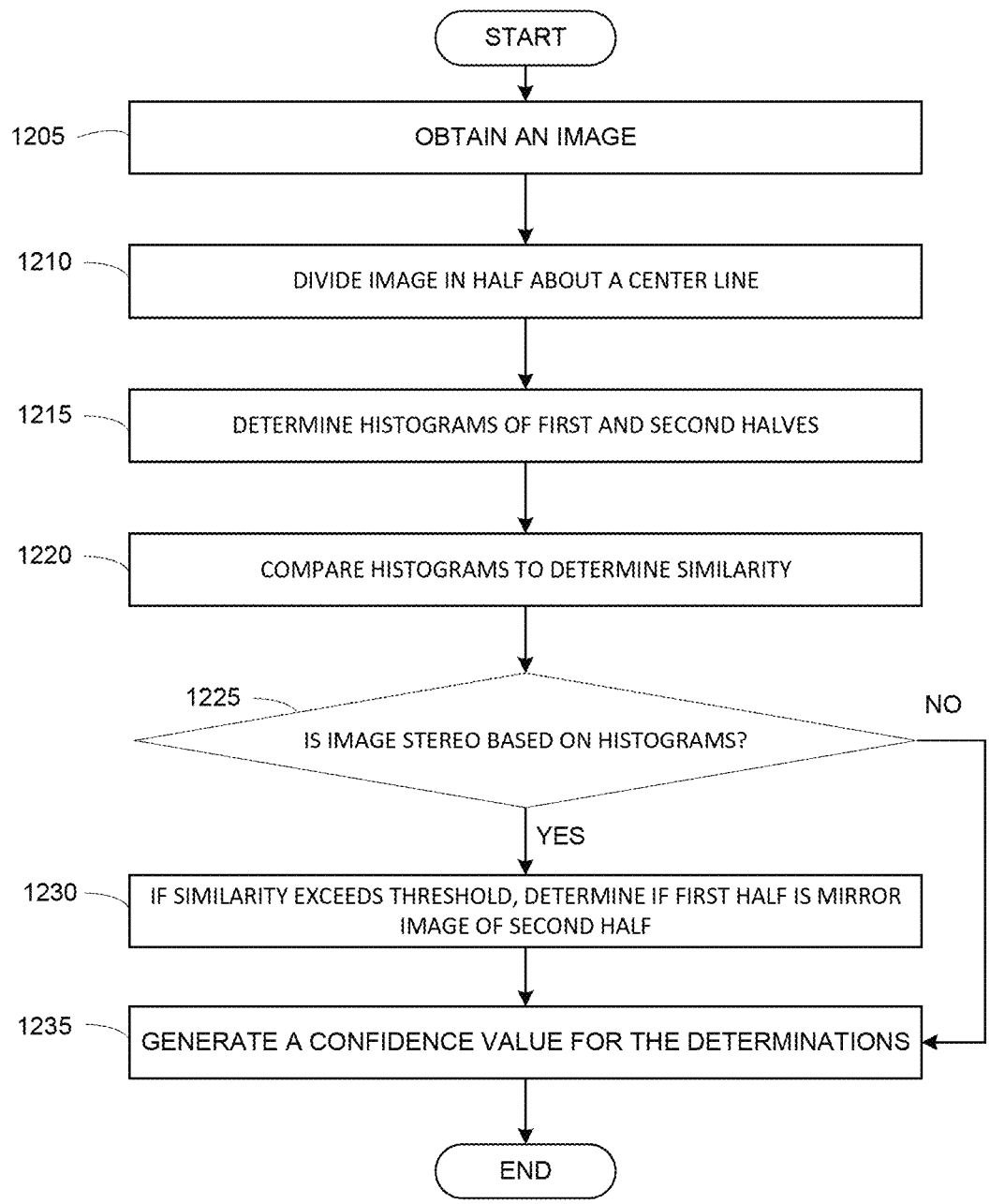
FIG. 12 illustrates an example process for image similarity detection in accordance with various embodiments of the present disclosure.

FIG. 12 illustrates an example process for image similarity detection in accordance with various embodiments of the present disclosure. In some embodiments, the process of FIG. 12 may be performed by the electronic device 101, the electronic device 220, the HMD system 315, or any other suitable system capable of displaying stereo or non-stereo images. For simplicity, the process will be described as performed by an electronic device.

The process begins with the electronic device obtaining an image at step 1205. The image may be obtained in various ways, for example by receiving the image from an external source, by extracting a frame from video content, or the like. The process is directed at determining whether the image is a stereo or a non-stereo image. The electronic device then, at step 1210, divides the image into a first half and a second half about a center line. Thereafter, the electronic device determines histograms for each of the first and second halves of the image at step 1215. Once the histograms are determined, the electronic device compares the histograms at step 1220 to determine how similar they are.

At step 1225, the electronic device determines whether the image is a stereo or non-stereo image based on the similarity of the histograms of the first and second halves of the image. In some embodiments, the percentage similarity of the histograms is compared to a predetermined threshold. If the percentage similarity surpasses the threshold, it indicates that the two halves of the image are very similar, which in turn is a preliminary indication that the image is a stereo image. In this case, the process moves to step 1230 to confirm that the image is a stereo image and not a non-stereo image with reflective symmetry. If the percentage similarity falls short of the threshold, it indicates that the two halves of the image are not similar, which indicates that the image is a non-stereo image, and the process proceeds to step 1235, described further below.

In the case that the percentage similarity surpasses the threshold, the electronic device may, at step 1230, further determine whether the image is actually a non-stereo image that happens to have reflective symmetry about the center line that divides the two halves. In such a case, symmetry may be determined by flipping one of the halves and subtracting it from the other half (e.g., subtracting the pixel values from each other). A zero or near-zero result indicates that the two halves are mirror images of each other, and not a stereo image.

Once the determination of stereo or non-stereo image is made, the electronic device may generate a confidence value for the result at step 1235. For example, if the histograms are only somewhat similar to each other, a confidence value may be acceptable but not high. If the histograms are almost entirely similar to each other, the confidence value may be high.

Figure 13:
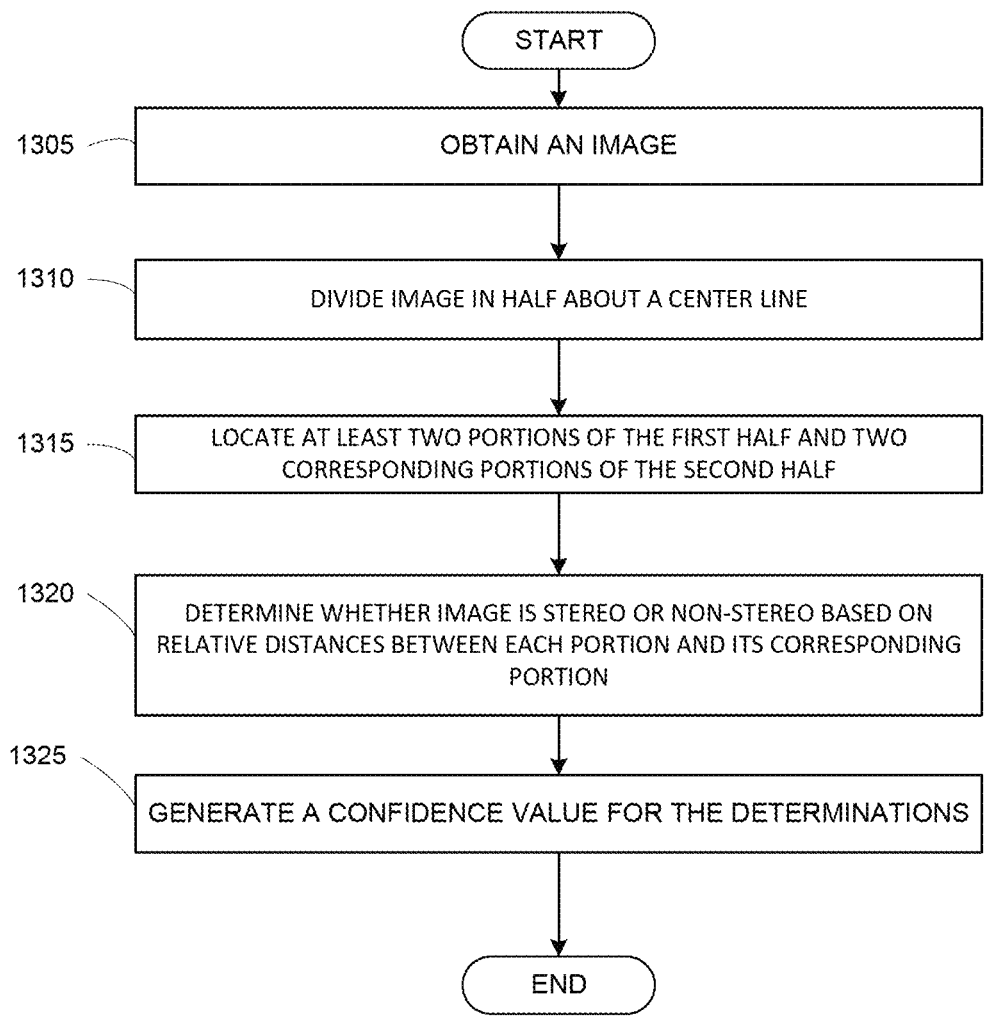
FIG. 13 illustrates an example process for monoscopic content detection in accordance with various embodiments of the present disclosure.

FIG. 13 illustrates an example process for monoscopic content detection in accordance with various embodiments of the present disclosure. In some embodiments, the process of FIG. 13 may be performed by the electronic device 101, the electronic device 220, the HMD system 315, or any other suitable system capable of displaying stereo or non-stereo images. For simplicity, the process will be described as performed by an electronic device.

The process begins with the electronic device obtaining an image at step 1305. The image may be obtained in various ways, for example by receiving the image from an external source, by extracting a frame from video content, or the like. The process is directed at determining whether the image is a stereo or a non-stereo image. The electronic device then divides the image into a first half and a second half about a center line (step 1310).

Thereafter, at step 1315, the electronic device chooses two portions of a first half of the image, preferably containing identifiable objects, and locates corresponding objects in the second half of the image. For example, computer vision, edge detection, or other optical recognition techniques may be used to detect the objects.

The electronic device then determines at step 1320 a first distance between each portion (or object) in the first pair of portions (or objects), and determines a second distance between each portion (or object) in the second pair of portions (or objects). The electronic device may then determine that if the first and second distances are substantially similar, the image is a monoscopic stereo image. Similarly, if the distances between the objects in each pair of objects are different, it may be determined that the image is a stereoscopic stereo image.

Once the determination of stereo or non-stereo image is made, the electronic device may generate a confidence value for the result at step 1325. For example, if the distances are only somewhat similar to each other, a confidence value may be acceptable but not high. If the distances are almost entirely similar to each other, the confidence value may be high.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method comprising:
   obtaining an image that is rendered for display on a display of an electronic device;
   analyzing at least a portion of the image;
   determining whether the image is a stereo image or a non-stereo image based on the analysis; and
   generating a confidence value related to the determination, the confidence value indicating a likelihood that the determination of whether the image is a stereo image or a non-stereo image is correct.

2. The method of claim 1, wherein:
   analyzing the at least a portion of the image includes:
      isolating an icon in the at least a portion of the image, and
      determining whether the icon includes at least one shape, and
   determining whether the image is a stereo image or a non-stereo image includes determining whether the at least one shape is a predetermined shape.

3. The method of claim 1, wherein:
   analyzing at least a portion of the image includes:
      isolating an icon in the at least a portion of the image
      dividing the icon into a first half and a second half about a center line, and
      comparing the first half to the second half;
   determining whether the image is a stereo image or a non-stereo image includes determining whether the first half and the second half of the icon are symmetrical to each other about the center line; and
   generating the confidence value includes:
      comparing symmetry of the first half and the second half of the icon to an expected value of symmetry; and
      determining the confidence value based on a result of the comparison.

4. The method of claim 1, wherein:
   analyzing at least a portion of the image includes:
      separating the at least a portion of the image into a first half and a second half;
      calculating a correlation coefficient for information in the first half of the at least a portion of the image and information in the second half of the at least a portion of the image, and
      determining whether the image is a stereo image or a non-stereo image includes comparing the correlation coefficient to a predetermined threshold.

5. The method of claim 1, wherein:
   analyzing at least a portion of the image includes:
      separating the at least a portion of the image into a first half and a second half;
      dividing the first half into a number of first segments;
      selecting a segment of the first half from the first segments as a sample segment; and
      searching for a candidate segment within an area around a location within the second half that corresponds to a location of the sample segment within the first half, wherein the candidate segment is substantially similar to the sample segment; and
   wherein determining whether the image is a stereo image or a non-stereo image includes determining a similarity between the sample segment of the first half and the candidate segment of the second half.

6. The method of claim 1, wherein:
   analyzing at least a portion of the image includes:
      separating the at least a portion of the image into a first half and a second half;
      generating a first histogram of pixel values for the first half and a second histogram of pixel values for the second half;
   determining whether the image is a stereo image or a non-stereo image includes determining an amount of similarity between the first histogram to the second histogram; and
   generating the confidence value includes generating the confidence value based on the amount of similarity between the first histogram to the second histogram.

7. The method of claim 6, further comprising:
   determining whether the first half is a mirror image of the second half based on the amount of similarity meeting or exceeding a predefined threshold;
   wherein determining whether the image is a stereo image or a non-stereo image includes determining, when the first half is a mirror image of the second half, the image is not a stereo image.

8. The method of claim 1, wherein analyzing at least a portion of the image further comprises:
   separating the at least a portion of the image into a first half and a second half;
   comparing the first half to the second half, the comparing including locating at least two objects in the first half and at least two corresponding objects in the second half;
   identifying pairs of corresponding objects between the at least two objects in the first half and the at least two objects in the second half;
   determining, for each pair of corresponding objects, a distance between each object comprising the pair; and
   determining, when distances for each pair of corresponding objects are substantially equal, that the image is a monoscopic image.

9. A system comprising:
   a display configured to display stereo and non-stereo images;
   a processor configured to:
      obtain an image that is rendered for display on the display;
      analyze at least a portion of the image;
      determine whether the image is a stereo image or a non-stereo image based on the analysis; and
      generate a confidence value related to the determination of whether the image is a stereo image or a non-stereo image, the confidence value indicating a likelihood that the determination is correct.

10. The system of claim 9, wherein the processor is further configured to:
 analyze the at least a portion of the image by isolating an icon in the at least a portion of the image and determining whether the icon includes at least one shape; and
 determine whether the image is a stereo image or a non-stereo image by determining whether the at least one shape is a predetermined shape.

11. The system of claim 9, wherein the processor is further configured to:
 analyze at least a portion of the image by:
  separating the at least a portion of the image into a first half and a second half; and
  calculating a correlation coefficient for information the first half of the at least a portion of the image and information in the second half of the at least a portion of the image; and
 determine whether the image is a stereo image or a non-stereo image by comparing the correlation coefficient to a predetermined threshold.

12. The system of claim 9, wherein the processor is configured to:
 analyze at least a portion of the image by:
  separating the at least a portion of the image into a first half and a second half;
  dividing the first half into a number of first segments;
  selecting a segment of the first half from the first segments as a sample segment; and
  searching for a candidate segment within an area around a location within the second half that corresponds to a location of the sample segment within the first half, wherein the candidate segment is substantially similar to the sample segment; and
 determine whether the image is a stereo image or a non-stereo image by determining a similarity between the sample segment of the first half and the candidate segment of the second half.

13. The system of claim 9, wherein the processor is configured to:
 analyze at least a portion of the image by:
  separating the at least a portion of the image into a first half and a second half;
  generating a first histogram of pixel values for the first half and a second histogram of pixel values for the second half;
 determine whether the image is a stereo image or a non-stereo image by determining an amount of similarity between the first histogram to the second histogram; and
 generate the confidence value by generating the confidence value based on the amount of similarity between the first histogram to the second histogram.

14. The system of claim 9, wherein the processor is further configured to:
 separate the at least a portion of the image into a first half and a second half;
 compare the first half to the second half, the processor configured to compare the first half to the second half by locating at least two objects in the first half and at least two corresponding objects in the second half;
 identify pairs of corresponding objects between the at least two objects in the first half and the at least two objects in the second half;
 determine, for each pair of corresponding objects, a distance between each object comprising the pair; and
 determine, when distances for each pair of corresponding objects are substantially equal, that the image is monoscopic image.

15. A non-transitory computer readable medium comprising instructions executable by at least one processor to:
 obtain an image that is rendered for display on a display of an electronic device;
 analyze at least a portion of the image;
 determine whether the image is a stereo image or a non-stereo image based on the analysis; and
 generate a confidence value related to the determination of whether the image is a stereo image or a non-stereo image, the confidence value indicating a likelihood that the determination is correct.

16. The non-transitory computer readable medium of claim 15, wherein the computer readable medium further comprises instructions that, when executed, cause the at least one processor to:
 analyze the at least a portion of the image by isolating an icon in the at least a portion of the image, and determining whether the icon includes at least one shape; and
 determine whether the image is a stereo image or a non-stereo image includes determining whether the at least one shape is a predetermined shape.

17. The non-transitory computer readable medium of claim 15, further comprising instructions that, when executed, further cause the at least one processor to:
 analyze at least a portion of the image by:
  separating the at least a portion of the image into a first half and a second half;
  calculating a correlation coefficient for information in the first half of the at least a portion of the image and information in the second half of the at least a portion of the image; and
 determine whether the image is a stereo image or a non-stereo image by comparing the correlation coefficient to a predetermined threshold.

18. The non-transitory computer readable medium of claim 15, further comprising instructions that, when executed, cause the at least one processor to:
 analyze at least a portion of the image by:
  separating the at least a portion of the image into a first half and a second half;
  dividing The first half into a number of first segments;
  selecting a segment of the first half from the first segments as a sample segment; and
  searching for a candidate segment within an area around a location within the second half that corresponds to a location of the sample segment within the first half, wherein the candidate segment is substantially similar to a sample portion; and
 determine whether the image is a stereo image or a non-stereo image by determining a similarity between the sample segment of the first half and the candidate segment of the second half.

19. The non-transitory computer readable medium of claim 15, further comprising instructions that, when executed, cause the at least one processor to:
 analyze at least a portion of the image by:
  separating the at least a portion of the image into a first half and a second half; and
  generating a first histogram of pixel values for the first half and a second histogram of pixel values for the second half;

determine whether the image is a stereo image or a non-stereo image by determining an amount of similarity between the first histogram to the second histogram; and generate the confidence value by generating the confidence value based on the amount of similarity between the first histogram to the second histogram.

20. The non-transitory computer readable medium of claim 15, further comprising instructions that, when executed, cause the at least one processor to:

separate the at least a portion of the image into a first half and a second half;

compare the first half to the second half, wherein the instructions that, when executed, cause the at least one processor to compare the first half to the second half include instructions that, when executed, cause the at least one processor to locate at least two objects in the first half and at least two corresponding objects in the second half;

identify pairs of corresponding objects between the at least two objects in the first half and the at least two objects in the second half;

determine, for each pair of corresponding objects, a distance between each object comprising the pair; and determine, when distances for each pair of corresponding objects are substantially equal, that the image is a monoscopic image.

\* \* \* \* \*